US010626995B2

(12) United States Patent
Itadani

(10) Patent No.: US 10,626,995 B2
(45) Date of Patent: Apr. 21, 2020

(54) SLIDING COMPONENT

(71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 15/765,705

(22) PCT Filed: Oct. 4, 2016

(86) PCT No.: PCT/JP2016/079407
§ 371 (c)(1),
(2) Date: Apr. 3, 2018

(87) PCT Pub. No.: WO2017/061406
PCT Pub. Date: Apr. 13, 2017

(65) Prior Publication Data
US 2018/0299015 A1 Oct. 18, 2018

(30) Foreign Application Priority Data
Oct. 5, 2015 (JP) ................................ 2015-197985

(51) Int. Cl.
*F16J 15/34* (2006.01)
(52) U.S. Cl.
CPC ....... *F16J 15/3448* (2013.01); *F16J 15/3412* (2013.01)
(58) Field of Classification Search
CPC .... F16J 15/3448; F16J 15/348; F16J 15/3484; F16J 15/3488; F16J 15/34; F16J 15/3404;
(Continued)

(56) References Cited

U.S. PATENT DOCUMENTS

2011/0215535 A1* 9/2011 Vasagar ............... F16J 15/3244
277/559
2015/0115537 A1* 4/2015 Tokunaga ............ F16J 15/348
277/348

(Continued)

FOREIGN PATENT DOCUMENTS

WO 2014042045 A1 3/2014
WO 2014050920 A1 4/2014

OTHER PUBLICATIONS

International Search Report (ISR) dated Dec. 27, 2016, issued for International application No. PCT/JP2016/079407.

*Primary Examiner* — Kristina R Fulton
*Assistant Examiner* — L. Susmitha Koneru
(74) *Attorney, Agent, or Firm* — Law Office of Katsuhiro Arai

(57) ABSTRACT

A sliding component provides both functions of leakage prevention and lubrication in accordance with environments such as the type, temperature, and pressure of a sealed fluid and the sliding speed of a sliding face. Dimples 10 are provided in one of the sliding faces of a pair of sliding parts that slide relative to each other. Each of the dimples 10 has an upstream cavitation formation region 10a disposed close to the low-pressure fluid side and a downstream positive pressure generation region 10b disposed close to the high-pressure fluid side. The positive pressure generation region 10b has a downstream distal end at which a positive pressure relief groove 15 connecting the positive pressure generation region 10b and the high-pressure fluid side is provided, thereby being configured to control the ratio between the size of the cavitation formation region 10a and the size of the positive pressure generation region 10b.

18 Claims, 8 Drawing Sheets

(58) Field of Classification Search
CPC ... F16J 15/3416; F16J 15/3424; F16J 15/3428
See application file for complete search history.

(56) References Cited

U.S. PATENT DOCUMENTS

2015/0115540 A1    4/2015  Tokunaga
2015/0123350 A1*   5/2015  Itadani ................ F16J 15/3424
                                                       277/400

* cited by examiner

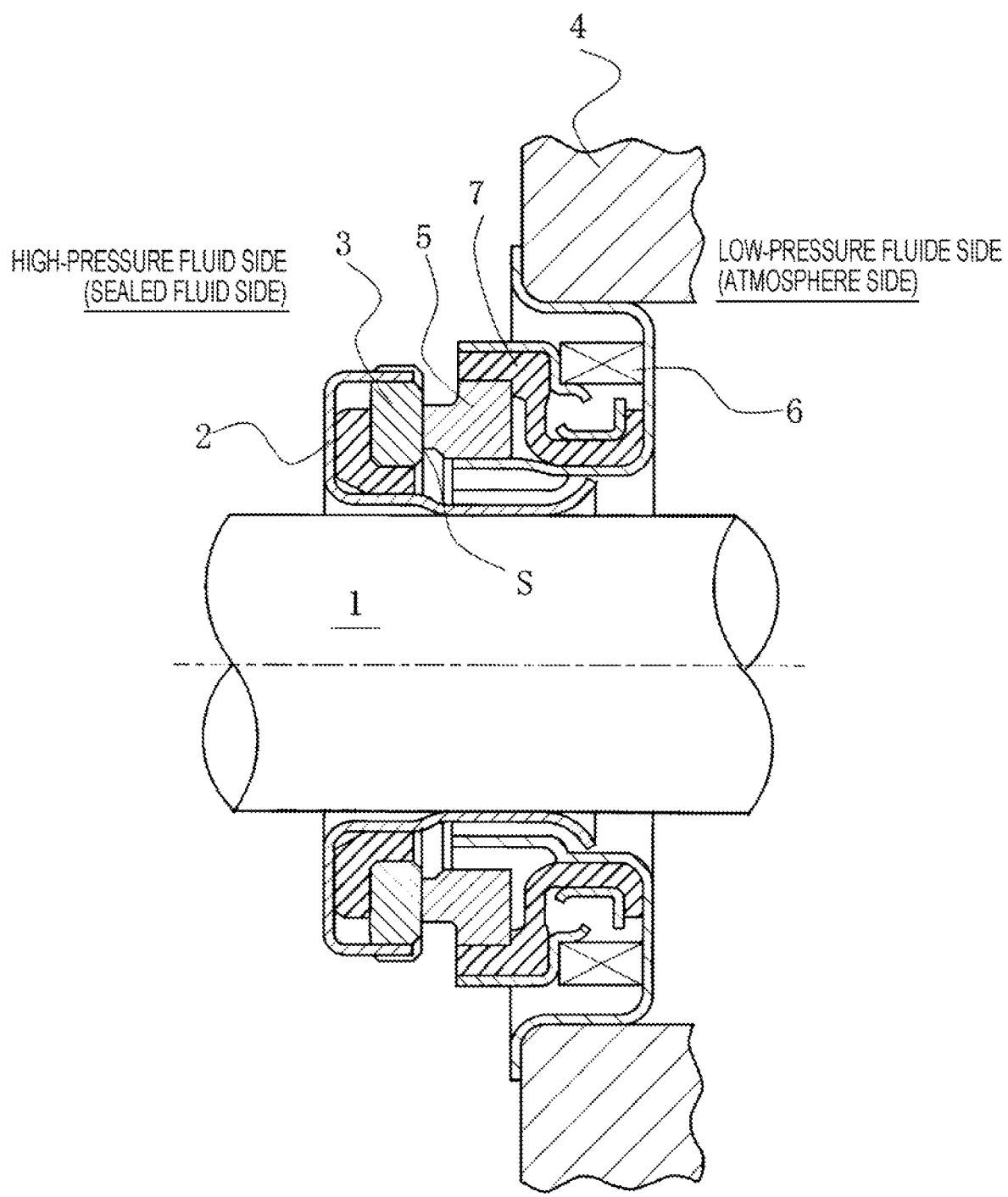

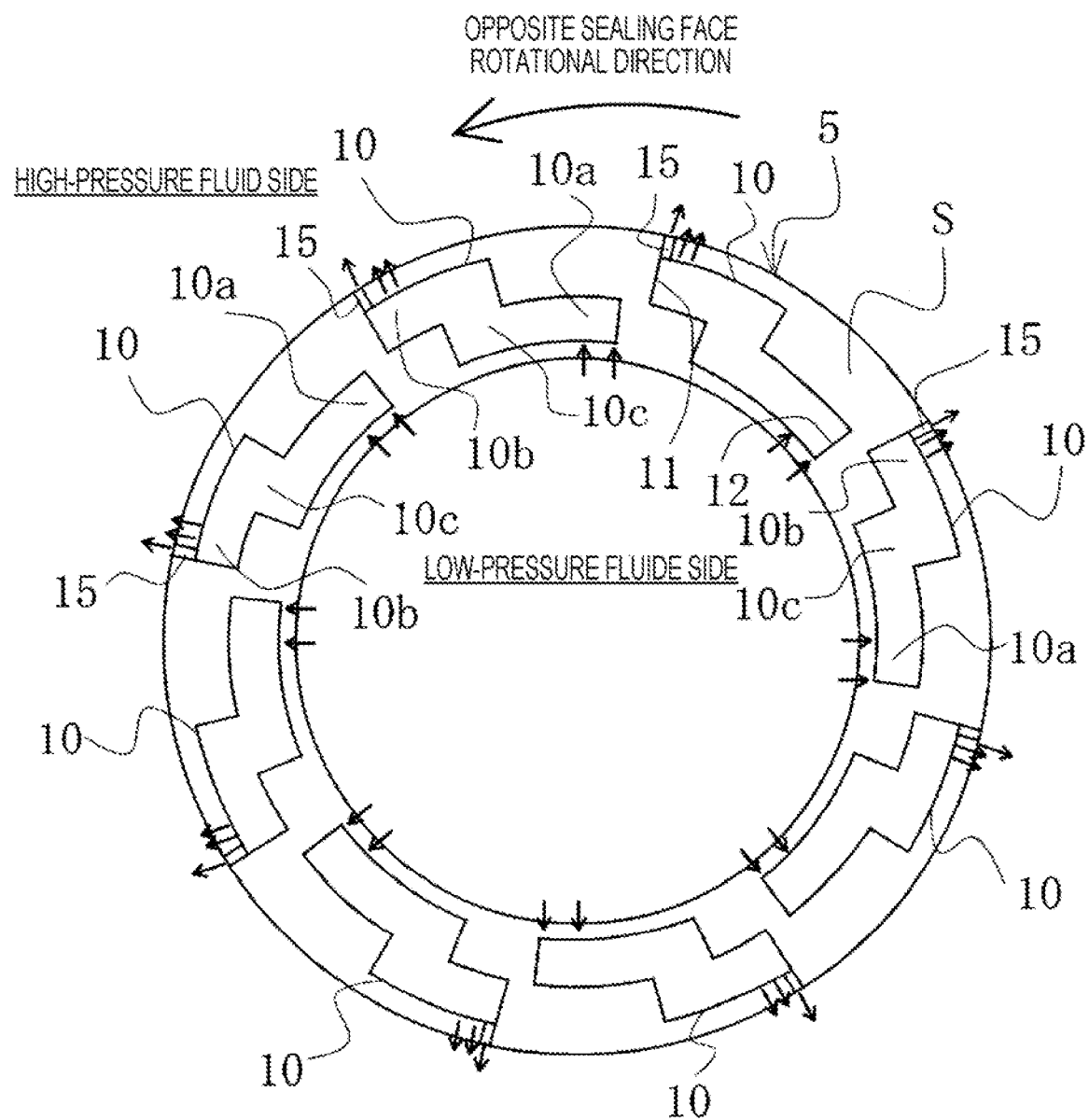

SLIDING COMPONENT

This application is the U.S. National Phase under 35 U.S.C. § 371 of International Application PCT/JP2016/079407, filed Oct. 4, 2016, which claims priority to Japanese Patent Application No. 2015-197985, filed Oct. 5, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding components such as seal rings or bearings that are required to reduce friction by interposing fluid between sliding faces and to prevent the fluid leakage from the sliding faces.

BACKGROUND ART

In order for a mechanical seal as an example of a sliding component, to maintain sealing performance for a long period of time, the sliding component needs to satisfy both conflicting conditions of "sealing" and "lubrication." In particular, in recent years, for environmental measures or the like, there has been an increasing demand for a further friction reduction to reduce mechanical loss while preventing leakage of a sealed fluid. A technique to reduce friction can be achieved by generating dynamic pressure between sliding faces by rotation to bring the sliding faces into a so-called fluid lubrication state where the sliding faces slide with a liquid film interposed therebetween. However, in this case, positive pressure is generated between the sliding faces; therefore, fluid flows out from a positive-pressure portion to the outside of the sliding faces. That is a side leakage in bearings, which corresponds to a leakage in seals.

To achieve both sealing and lubrication, the present applicant has previously filed an application for an invention (hereinafter, referred to as a "prior art", see Patent Document 1) in which, as shown in FIG. 8, dimples 50 are provided in one of sliding faces S of a pair of sliding parts that slide relative to each other, and an upstream cavitation formation region 50a of each of the dimples 50 is disposed close to the low-pressure fluid side and a downstream positive pressure generation region 50b of each of the dimples 50 is disposed close to the high-pressure fluid side. A fluid drawn into the cavitation formation region 50a of each dimple 50 passes through the dimple 50 and is returned from the positive pressure generation region 50b toward the high-pressure fluid side and therefore leakage is reduced. At the same time, a liquid film is held between the sliding faces by positive pressure generated in the positive pressure generation region 50b and therefore wear is reduced.

The prior art described in Patent Document 1 is a breakthrough invention that achieves both sealing and lubrication.

The invention of the present application relates to improvements in the prior art.

It has been found by experiments that in the prior art described in Patent Document 1, depending on the type, temperature, and pressure of the sealed fluid, the sliding speed of the sliding face, and the like, the cavitation formation region 50a does not extend toward the downstream side and the positive pressure generation region 50b is excessively increased and therefore sealing performance is reduced.

For example, when the sliding speed of the sliding face is changed under the condition where the type, temperature, and pressure of the sealed fluid are fixed, a phenomenon where leakage is found at middle rpms and leakage is hardly found at high rpms has been observed.

CITATION LIST

Patent Document

Patent Document 1: WO 2014/050920 A1

SUMMARY OF THE INVENTION

Problem to be Solved by the Invention

The present invention has been made to solve the above-described problem of the prior art, and it is an object of the present invention to provide a sliding component having both functions of leakage prevention and lubrication in accordance with the environment such as the type, temperature, and pressure of a sealed fluid and the sliding speed of a sliding face by enabling the control of a ratio between the sizes of an upstream cavitation formation region and a downstream positive pressure generation region that are created in a recessed portion (in the specification, referred to as "a dimple") such as a dimple formed in a sliding face.

Means for Solving Problem

In order to attain the above object, a sliding component according to a first aspect of the present invention includes a pair of sliding parts having sliding faces to slide relative to each other, one of the sliding faces being provided with dimples, each dimple having an upstream cavitation formation region disposed close to a low-pressure fluid side and a downstream positive pressure generation region disposed close to a high-pressure fluid side, the positive pressure generation region having a downstream distal end at which a positive pressure relief groove connecting the positive pressure generation region and the high-pressure fluid side is provided, the positive pressure relief groove being configured to control a ratio between a size of the cavitation formation region and a size of the positive pressure generation region.

According to this aspect, the sliding component having both functions of leakage prevention and lubrication in accordance with the environment such as the type, temperature, and pressure of a sealed fluid and the sliding speed of a sliding face can be provided.

According to a second aspect of the present invention, in the sliding component in the first aspect, the positive pressure relief groove is formed on the sliding face.

According to this aspect, the positive pressure relief groove can be easily formed.

According to a third aspect of the present invention, in the sliding component in the first aspect, the positive pressure relief groove is formed to extend through the inside of the sliding face.

According to this aspect, no groove is formed on the sliding face. Therefore, the sliding face can be kept clean. In addition, since the area of the sliding face is not reduced, an increase in surface pressure can be prevented.

According to a fourth aspect of the present invention, in the sliding component in any one of the first to third aspects, the dimples circumferentially adjacent to each other are arranged such that the positive pressure generation region of the dimple located at the upstream side is radially overlapped with the cavitation formation region of the dimple located at the downstream side.

According to this aspect, the effect of leakage prevention is further exerted.

According to a fifth aspect of the present invention, in the sliding component in any one of the first to fourth aspects, the dimple includes a shape which has a radially fixed width and which circumferentially extends. A downstream end of the positive pressure generation region and a downstream end of a connection region connecting the cavitation formation region and the positive pressure generation region are formed to be inclined downstream from the low-pressure fluid side to the high-pressure fluid side.

According to this aspect, the flow of fluid in the dimple becomes smooth, and a radial fluid flow from the low-pressure fluid side to the high-pressure fluid side is generated. Therefore, sealing performance can be further enhanced.

According to a sixth aspect of the present invention, in the sliding component in the fifth aspect, the positive pressure relief groove is provided at an angle parallel to the downstream end of the positive pressure generation region.

According to this aspect, positive pressure generated in the positive pressure generation region can be smoothly released to the high-pressure fluid side. Therefore, sealing performance can be further enhanced.

Effects of the Invention

The present invention exerts the following beneficial effects.
(1) The positive pressure relief groove that connects the positive pressure generation region and the high-pressure fluid side is provided at the downstream distal end of the positive pressure generation region, thereby being configured to control the ratio between the size of the cavitation formation region and the size of the positive pressure generation region. Therefore, the sliding component having the both functions of leakage prevention and lubrication in accordance with the environment such as the type, temperature, and pressure of a sealed fluid and the sliding speed of a sliding face can be provided.
(2) The positive pressure relief groove is formed on the sliding face. Therefore, the positive pressure relief groove can be easily formed.
(3) The positive pressure relief groove is formed to extend through the inside of the sliding face. Therefore, no groove is formed on the sliding face. Thus, the sliding face can be kept clean. In addition, since the area of the sliding face is not reduced, an increase in surface pressure can be prevented.
(4) The dimples circumferentially adjacent to each other are arranged such that the positive pressure generation region of the dimple located at the upstream side is radially overlapped with the cavitation formation region of the dimple located at the downstream side. Therefore, the effect of leakage prevention is further exerted.

The dimple includes a shape which has a radially fixed width and which circumferentially extends. A downstream end of the positive pressure generation region and a downstream end of a connection region connecting the cavitation formation region and the positive pressure generation region are formed to be inclined downstream from the low-pressure fluid side to the high-pressure fluid side. Therefore, the flow of fluid in the dimple becomes smooth, and a radial fluid flow from the low-pressure fluid side to the high-pressure fluid side is generated. Consequently, sealing performance can be further enhanced.
(6) The positive pressure relief groove is provided at an angle parallel to the downstream end of the positive pressure generation region. Therefore, positive pressure generated in the positive pressure generation region can be smoothly released to the high-pressure fluid side. Consequently, sealing performance can be further enhanced.

BRIEF DESCRIPTION OF THE DRAWINGS

FIG. 1 is a vertical cross-sectional view showing an example of a mechanical seal according to a first embodiment of the present invention.

FIG. 2 is a plan view of a sliding face of a sliding part according to the first embodiment of the present invention.

DESCRIPTION OF EMBODIMENTS

Figure 3A:
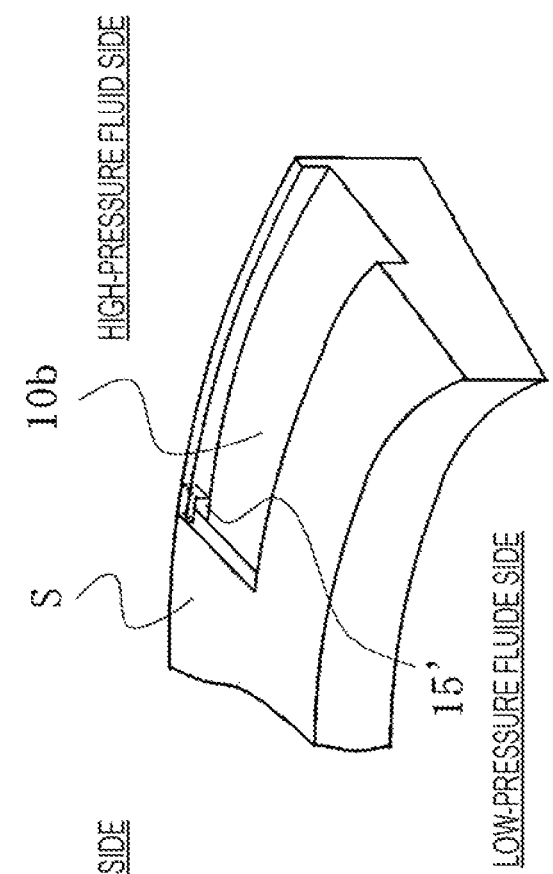
FIG. 3A is a perspective view of a positive pressure generation region and a positive pressure relief groove in FIG. 1.

Hereinafter, with reference to the drawings, modes for implementing this invention will be illustratively described based on embodiments. Note that the dimensions, materials, shapes, relative arrangements, and the like of components described in the embodiments are not intended to limit the scope of the present invention only to them unless otherwise explicitly described.

First Embodiment

With reference to FIGS. 1 to 4, a sliding component according to a first embodiment of the present invention will be described.

In the present embodiment, a case where parts configuring a mechanical seal are sliding parts is described as an example.

FIG. 1 is a vertical cross-sectional view showing an example of a mechanical seal, which is an inside mechanical seal in a form of sealing a sealed fluid on the high-pressure fluid side, which is likely to leak from the outer periphery toward the inner periphery of sliding faces. An annular rotating ring 3 provided on the side of a rotating shaft 1 so as to integrally rotate via a sleeve 2 with the rotating shaft 1 that is configured to drive a pump impeller (not shown) on the high-pressure fluid side, and an annular stationary ring 5 non-rotatably and axially movably provided at a housing 4 of a pump are allowed by a coiled wave spring 6 and a bellows 7 that axially bias the stationary ring 5 to slide in close contact with each other via sliding faces S mirrorfinished by lapping or the like. That is, the mechanical seal prevents the sealed fluid between the respective sliding faces S of the rotating ring 3 and the stationary ring 5 from flowing from the outer periphery of the rotating shaft 1 to the atmosphere side.

It will be appreciated that the present invention is not limited to inside mechanical seals and is also applicable to outside mechanical seals each configured to seal a sealed fluid on the high-pressure fluid side, which is likely to leak from the inner periphery toward the outer periphery of sliding faces.

FIG. 2 shows a sliding face of a sliding part according to the first embodiment of the present invention. A case where dimples and positive pressure relief grooves are formed in the sliding face of the stationary ring 5 in FIG. 1 will be described as an example.

The same applies to a case where dimples and positive pressure relief grooves are formed in the sliding face of the rotating ring 3.

In FIG. 2, plural dimples 10 are provided circumferentially in the sliding face S. The dimples 10 do not communicate with the high-pressure fluid side and the low-pressure fluid side. The dimples 10 are provided to be independent of each other and circumferentially spaced from each other. The number, area, and depth of the dimples 10 are determined appropriately according to the diameter of the sliding part, the width and the relative movement speed of the sliding face, sealing and lubrication conditions, and the like. Dimples each having a large area and a shallow depth are preferable in terms of fluid lubrication action and liquid film formation.

Each of the dimples 10 has an upstream cavitation formation region 10*a* disposed close to the low-pressure fluid side and a downstream positive pressure generation region 10*b* disposed close to the high-pressure fluid side, and the dimple 10 is formed in such a shape that the two regions are communicated with each other via a connection region 10*c*. A fluid drawn into the cavitation formation region 10*a* of each dimple 10 as indicated by arrows passes through the dimple to generate dynamic pressure (positive pressure) in the positive pressure generation region 10*b*, thereafter being returned as indicated by arrows toward the high-pressure fluid side radially close to the positive pressure generation region 10*b*.

The dimple 10 shown in FIG. 2 is configured such that the upstream cavitation formation region 10*a* and the downstream positive pressure generation region 10*b* each extends circumferentially in an arc shape with a fixed width and such that the cavitation formation region 10*a* and the downstream positive pressure generation region 10*b* are radially integrally connected to each other to have a crank shape. Also, the circumferential length of the cavitation formation region 10*a* is formed to be longer than the circumferential length of the positive pressure generation region 10*b*. Since the circumferential length of the cavitation formation region 10*a* is longer than the circumferential length of the positive pressure generation region 10*b* in the dimple 10 of FIG. 2, an amount of fluid to be drawn increases and the effect of leakage prevention is significantly exerted.

The shape of the dimple 10 shown in FIG. 2 is only an example. In short, as long as the upstream cavitation formation region 10*a* is disposed close to the low-pressure fluid side and the downstream positive pressure generation region 10*b* is disposed close to the high-pressure fluid side, the dimple 10 may be, for example, a rectangle, an oval, or the like which is disposed in an inclined manner.

In this example, the fluid drawn into the cavitation formation region 10*a*, which is disposed close to the low-pressure fluid side, of each of the dimples 10 passes through the dimple to generate dynamic pressure (positive pressure) in the downstream positive pressure generation region 10*b* disposed close to the high-pressure fluid side, thereafter being returned toward the high-pressure fluid side radially close to the positive pressure generation region 10*b*. Thus, the sealed fluid on the high-pressure fluid side is prevented from leaking to the low-pressure fluid side, and a fluid lubrication film is formed between the sliding faces by the positive pressure generated in the positive pressure generation region 10*b*, thereby lubricating the sliding faces.

Here, with reference to FIG. 4, a positive pressure generation mechanism and a negative pressure generation mechanism in a case where the dimples in the present invention are provided will be described.

Figure 4A:
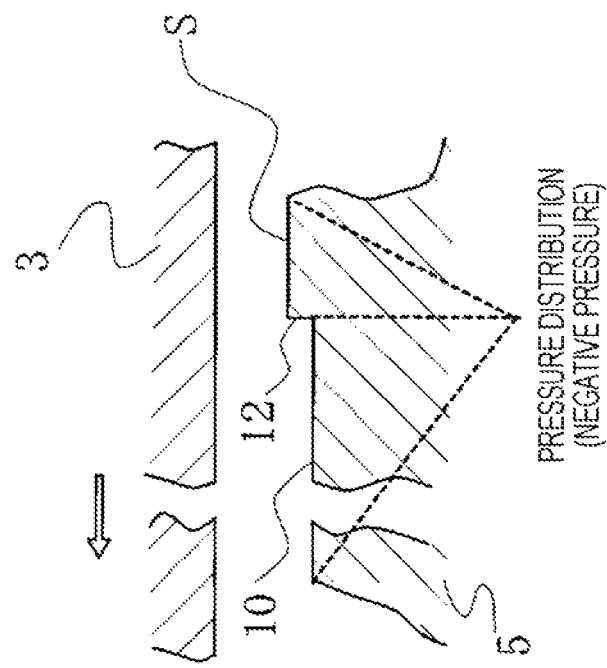
FIG. 4A is a diagram for illustrating a positive pressure generation mechanism including a narrowed gap (step) downstream of a dimple.

The rotating ring 3 rotationally moves counterclockwise with respect to the stationary ring 5 as indicated by an arrow in FIG. 4A. When the dimple 10 is formed in the sliding face S of the stationary ring 5, a narrowed gap (step) 11 is present downstream of the dimple 10. The sliding face of the opposing rotating ring 3 is flat.

When the rotating ring 3 relatively moves in a direction indicated by the arrow, the fluid interposed between the sliding faces of the rotating ring 3 and the stationary ring 5 moves to follow in the moving direction of the rotating ring 3 due to its viscosity. Consequently, at that time, dynamic pressure (positive pressure) as shown by broken lines is generated by the presence of the narrowed gap (step) 11.

Figure 4B:
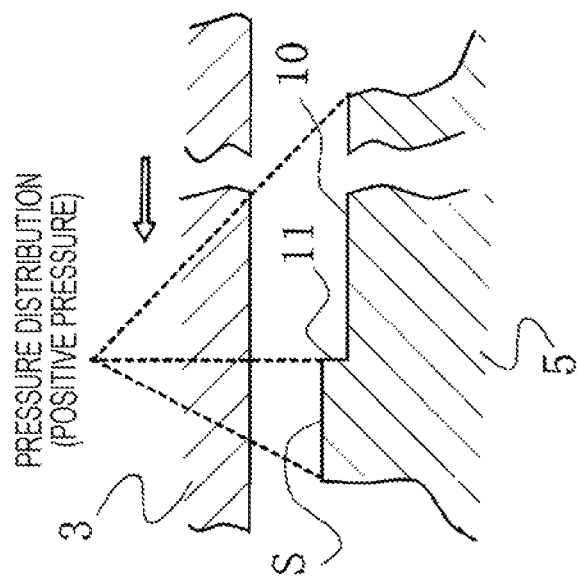
FIG. 4B is a diagram for illustrating a negative pressure generation mechanism including a widened gap (step) upstream of the dimple.

The rotating ring 3 rotationally moves counterclockwise with respect to the stationary ring 5 as indicated by an arrow in FIG. 4B. When the dimple 10 is formed in the sliding face S of the stationary ring 5, a widened gap (step) 12 is present upstream of the dimple 10. The sliding face of the opposing rotating ring 3 is flat.

When the rotating ring 3 relatively moves in a direction indicated by the arrow, the fluid interposed between the sliding faces of the rotating ring 3 and the stationary ring 5 moves to follow in the moving direction of the rotating ring 3 due to its viscosity. Consequently, at that time, dynamic pressure (negative pressure) as shown by broken lines is generated by the presence of the widened gap (step) 12.

Thus, in the dimple 10, negative pressure is generated at the upstream side and positive pressure is generated at the downstream side. Then, cavitation is generated in the upstream negative pressure generation region.

The present invention is characterized in that, as shown in FIG. 2, a positive pressure relief groove 15 connecting the positive pressure generation region 10*b* and the high-pressure fluid side is provided at a downstream distal end of the positive pressure generation region 10*b* and that the creation of the cavitation formation region 10*a* is controlled by the positive pressure relief groove 15.

The above-described "downstream distal end of the positive pressure generation region 10*b*" means the position in the positive pressure generation region 10*b* where pressure is higher than the pressure at the high-pressure fluid side.

The positive pressure relief groove 15 releases positive pressure generated at the downstream distal end of the positive pressure generation region 10*b* to the high-pressure fluid side, thereby preventing the positive pressure generation region 10*b* from expanding and contrarily allowing the cavitation formation region 10*a* to be generated in an appropriate range. For this reason, the positive pressure relief groove 15 having fixed width and depth is provided to connect the downstream distal end of the positive pressure generation region 10b and the high-pressure fluid side. In the example in FIG. 2, as shown in FIG. 3A, the positive pressure relief groove 15 formed on the sliding face has a substantially rectangular cross section, and its depth is set to be shallower than the depth of the dimple 10. The depth of the positive pressure relief groove 15 may be shallower than or equal to the depth of the dimple 10.

Also, in the example in FIG. 2, the positive pressure relief groove 15 is provided in a direction orthogonal to the flow of fluid, which is generated by the relative sliding with the opposing sliding face, but not limited thereto. The positive pressure relief groove 15 may be at any angle as long as positive pressure can be smoothly released to the high-pressure fluid side.

The cross-sectional area of the positive pressure relief groove 15 is determined in design under conditions such as the type, temperature, and pressure of the sealed fluid and the sliding speed of the sliding face. If the cross-sectional area of the positive pressure relief groove 15 is reduced, the magnitude of positive pressure generated in the positive pressure generation region 10b, that is, a positive pressure region can be increased; therefore, a region of cavitation generated in the cavitation formation region 10a can be reduced. Conversely, if the cross-sectional area of the positive pressure relief groove 15 is increased, the magnitude of positive pressure generated in the positive pressure generation region 10b, that is, a positive pressure region can be reduced; therefore, a region of cavitation generated in the cavitation formation region 10a can be increased.

As just described, the positive pressure relief groove is provided and thereby the magnitude of positive pressure generated in the positive pressure generation region 10b, that is, the ratio between the size of the upstream cavitation formation region 10a and the size of the downstream positive pressure generation region 10b can be controlled. Consequently, both leakage prevention and lubrication between the sliding faces can be achieved.

Figure 3B:
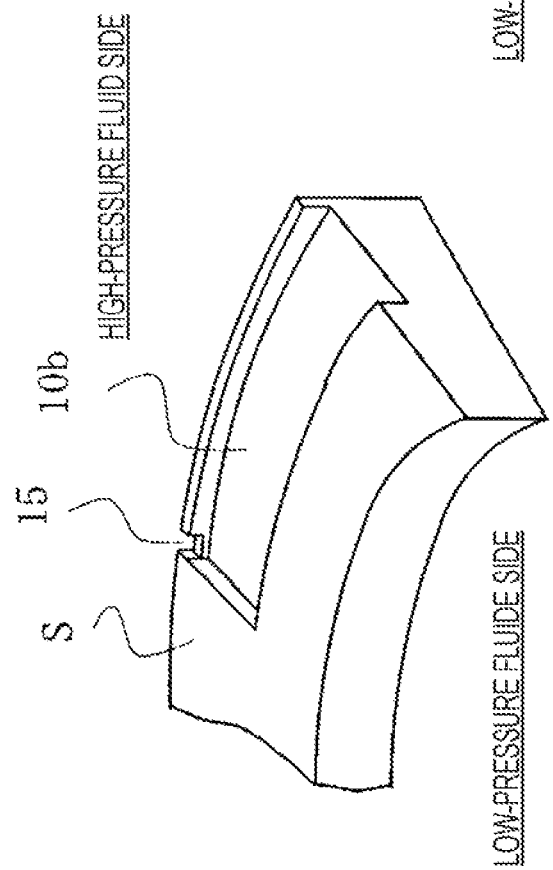
FIG. 3B is a perspective view showing a modified example of the positive pressure relief groove in FIG. 1.

FIG. 3B shows a modified example of the positive pressure relief groove. A positive pressure relief groove 15' having a substantially rectangular cross section and a depth set to be shallower than the depth of the dimple 10 is provided in such a manner as to extend through the inside of the sliding face S from the positive pressure generation region 10b of the dimple 10 to the high-pressure fluid side.

In this example, no groove is formed on the sliding face S; therefore, the sliding face S can be kept clean. In addition, since the area of the sliding face is not reduced, an increase in surface pressure can be prevented.

Note that the cross section of the positive pressure relief groove 15' is not limited to the substantially rectangular shape and may be a circle, semicircle, triangle, or the like.

According to the configurations of the first embodiment described above, the following effects are obtained.
(1) The positive pressure relief groove 15 that connects the positive pressure generation region 10b and the high-pressure fluid side is provided at the downstream distal end of the positive pressure generation region 10b, thereby being configured to control the ratio between the size of the cavitation formation region 10a and the size of the positive pressure generation region 10b. Therefore, the sliding component having both functions of leakage prevention and lubrication in accordance with the environment such as the type, temperature, and pressure of a sealed fluid and the sliding speed of a sliding face can be provided.
(2) When the positive pressure relief groove 15 is formed on the sliding face S, the positive pressure relief groove 15 can be easily formed.
(3) When the positive pressure relief groove 15 is formed in such a manner as to extend through the inside of the sliding face S, no groove is formed on the sliding face S. Therefore, the sliding face S can be kept clean. In addition, since the area of the sliding face is not reduced, an increase in surface pressure can be prevented.

Second Embodiment

Figure 5:
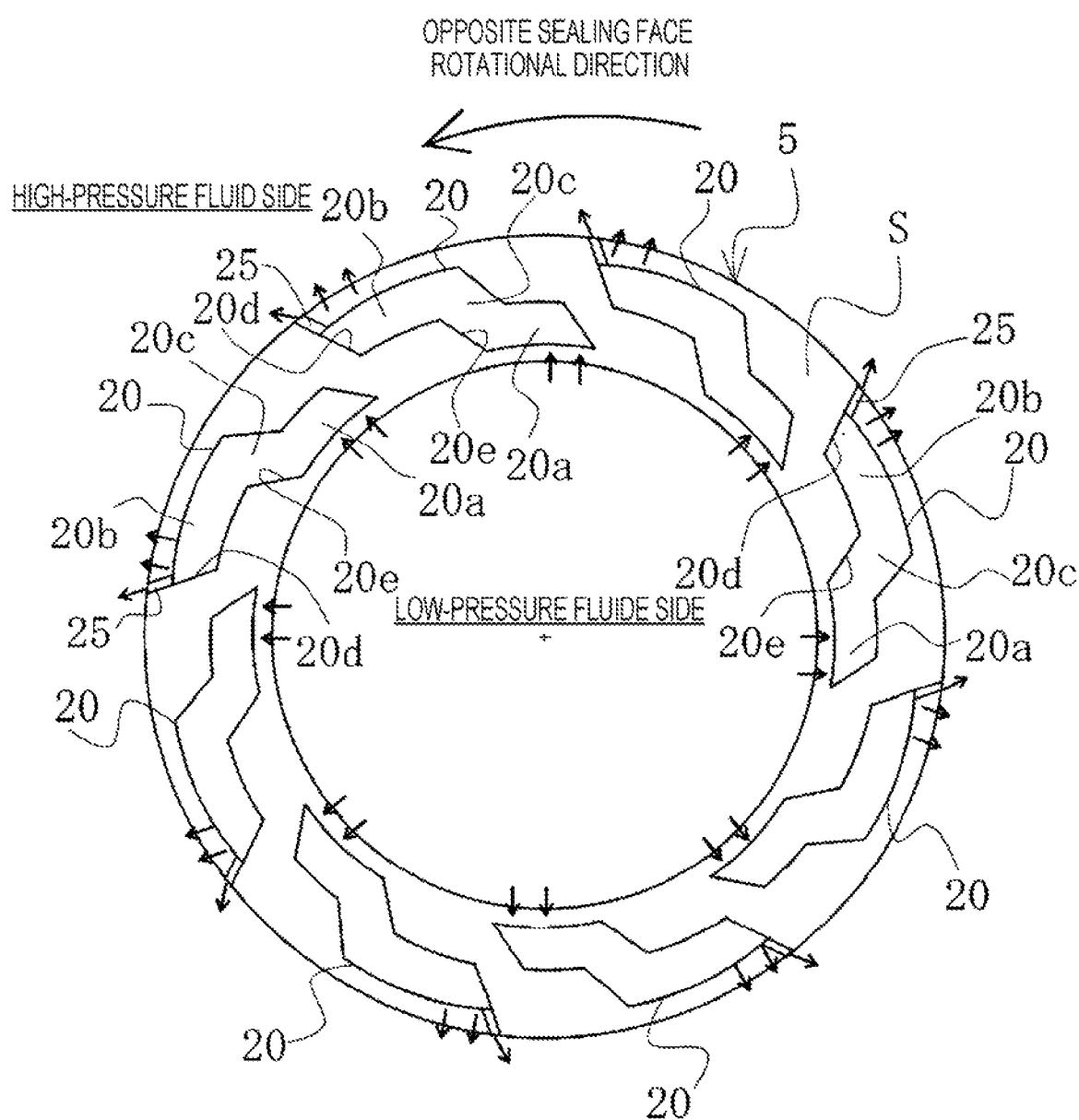
FIG. 5 is a plan view of a sliding face of a sliding part according to a second embodiment of the present invention.

FIG. 5 shows a sliding face of a sliding part according to a second embodiment of the present invention. A case where dimples and positive pressure relief grooves are formed in the sliding face of the stationary ring 5 in FIG. 1 will be described as an example.

The same applies to a case where dimples and positive pressure relief grooves are formed in the sliding face of the rotating ring 3.

The second embodiment is different from the first embodiment in the planar shapes of the dimples and the positive pressure relief grooves, but otherwise the same as the first embodiment. Therefore, redundant descriptions will be omitted.

In FIG. 5, dimples 20 each has an upstream cavitation formation region 20a disposed close to the low-pressure fluid side and a downstream positive pressure generation region 20b disposed close to the high-pressure fluid side, and the dimple 20 is formed in such a shape that the two regions are communicated with each other via a connection region 20c. The upstream cavitation formation region 20a and the downstream positive pressure generation region 20b each extends circumferentially in an arc shape with a fixed width. The cavitation formation region 20a and the downstream positive pressure generation region 20b are radially integrally connected to each other to have a crank shape.

A downstream end 20d of the positive pressure generation region 20b of the dimple 20 and a downstream end 20e of the connection region 20c that connects the cavitation formation region 20a and the positive pressure generation region 20b are formed in such a manner as to be inclined downstream from the low-pressure fluid side to the high-pressure fluid side.

Also, positive pressure relief grooves 25 are each provided at an angle parallel to the downstream end 20d of the positive pressure generation region 20b.

In the example in FIG. 5, the positive pressure relief groove 25 is formed on the sliding face S, but not limited thereto. The positive pressure relief groove 25 may be provided in such a manner as to extend through the inside of the sliding face S.

The downstream end 20d of the positive pressure generation region 20b of the dimple 20, and the downstream end 20e of the connection region 20c that connects the cavitation formation region 20a and the positive pressure generation region 20b are formed in such a manner as to be inclined downstream from the low-pressure fluid side to the high-pressure fluid side. Therefore, the flow of fluid in the dimple 20 becomes smooth, and a radial fluid flow from the low-pressure fluid side to the high-pressure fluid side is generated. Consequently, sealing performance can be further enhanced.

Further, the positive pressure relief groove 25 is provided at an angle parallel to the downstream end 20d of the positive pressure generation region 20b. Therefore, positive pressure generated in the positive pressure generation region 20b can be smoothly released to the high-pressure fluid side. Consequently, sealing performance can be further enhanced.

According to the configurations of the second embodiment described above, the following effects are obtained.

(1) The positive pressure relief groove 25 that connects the positive pressure generation region 20b and the high-pressure fluid side is provided at the downstream distal end of the positive pressure generation region 20b, thereby being configured to control the ratio between the size of the cavitation formation region 20a and the size of the positive pressure generation region 20b. Therefore, the sliding component having both functions of leakage prevention and lubrication in accordance with the environment such as the type, temperature, and pressure of a sealed fluid and the sliding speed of a sliding face can be provided.

(2) When the positive pressure relief groove 25 is formed on the sliding face S, the positive pressure relief groove 25 can be easily formed.

(3) When the positive pressure relief groove 25 is formed in such a manner as to extend through the inside of the sliding face S, no groove is formed on the sliding face S. Therefore, the sliding face S can be kept clean. In addition, since the area of the sliding face is not reduced, an increase in surface pressure can be prevented.

(4) The downstream end 20d of the positive pressure generation region 20b of the dimple 20, and the downstream end 20e of the connection region 20c that connects the cavitation formation region 20a and the positive pressure generation region 20b are formed in such a manner as to be inclined downstream from the low-pressure fluid side to the high-pressure fluid side. Therefore, the flow of fluid in the dimple 20 becomes smooth, and a radial fluid flow from the low-pressure fluid side to the high-pressure fluid side is generated. Consequently, sealing performance can be enhanced.

(5) The positive pressure relief groove 25 is provided at an angle parallel to the downstream end 20d of the positive pressure generation region 20b. Therefore, positive pressure generated in the positive pressure generation region 20b can be smoothly released to the high-pressure fluid side. Consequently, sealing performance can be further enhanced.

Third Embodiment

Figure 6:
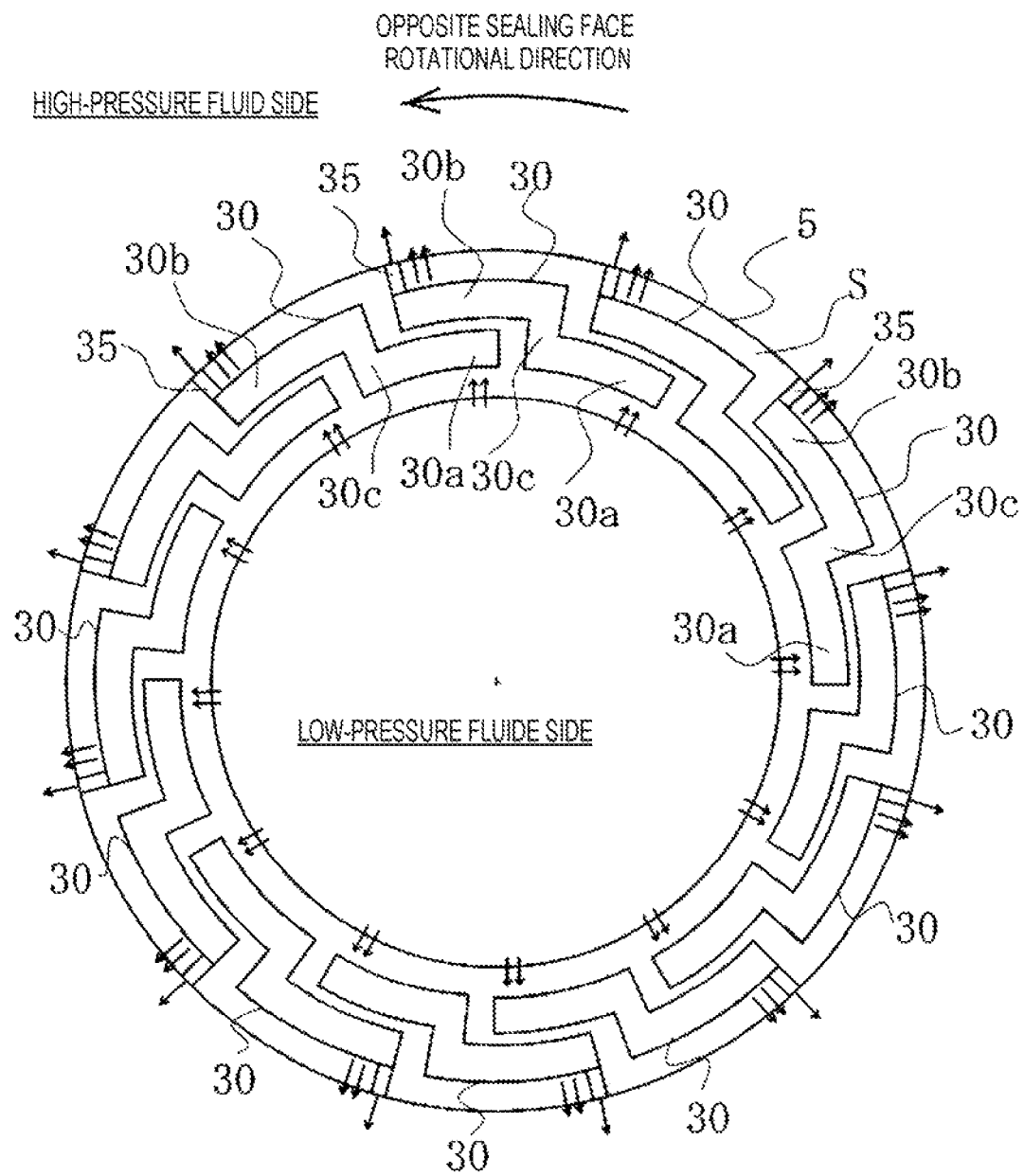
FIG. 6 is a plan view of a sliding face of a sliding part according to a third embodiment of the present invention.

FIG. 6 shows a sliding face of a sliding part according to a third embodiment of the present invention. A case where dimples and positive pressure relief grooves are formed in the sliding face of the stationary ring 5 in FIG. 1 will be described as an example.

The same applies to a case where dimples and positive pressure relief grooves are formed in the sliding face of the rotating ring 3.

The third embodiment is different from the first embodiment in the arrangement of dimples, but otherwise the same as the first embodiment. Therefore, redundant descriptions will be omitted.

In FIG. 6, dimples 30 circumferentially adjacent to each other are arranged such that a positive pressure generation region 30b of the dimple 30 located at the upstream side is radially overlapped with a cavitation formation region 30a of the dimple 30 located at the downstream side.

When dynamic pressure (positive pressure) is generated in the positive pressure generation region 30b of the dimple 30 located at the upstream side, a fluid is mainly returned toward the high-pressure fluid side near the positive pressure generation region 30b, but part of the fluid is likely to leak toward the low-pressure fluid side. However, the cavitation formation region 30a of the dimple 30 at the downstream side is disposed on the low-pressure fluid side of the positive pressure generation region 30b. Therefore, the fluid likely to leak toward the low-pressure fluid side is drawn into the cavitation formation region 30a, thus being prevented from leaking toward the low-pressure fluid side.

As illustrated in FIG. 6, positive pressure relief grooves 35 are each provided at a downstream distal end of the positive pressure generation region 30b to connect the positive pressure generation region 30b and the high-pressure fluid side. Thus, the creation of the cavitation formation region 30a is controlled by the positive pressure relief groove 35.

The positive pressure relief groove 35 releases positive pressure generated at the downstream distal end of the positive pressure generation region 30b to the high-pressure fluid side, thereby preventing the positive pressure generation region 30b from expanding and contrarily allowing the cavitation formation region 30a to be generated in an appropriate range. For this reason, the positive pressure relief groove 35 having fixed width and depth is provided to connect the downstream distal end of the positive pressure generation region 30b and the high-pressure fluid side.

In the example in FIG. 6, the positive pressure relief groove 35 is formed on the sliding face S, but not limited thereto. The positive pressure relief groove 35 may be provided in such a manner as to extend through the inside of the sliding face S.

According to the configurations of the third embodiment described above, the following effects are obtained.

(1) The positive pressure relief groove 35 that connects the positive pressure generation region 30b and the high-pressure fluid side is provided at the downstream distal end of the positive pressure generation region 30b, thereby being configured to control the ratio between the size of the cavitation formation region 30a and the size of the positive pressure generation region 30b. Therefore, the sliding component having both functions of leakage prevention and lubrication in accordance with the environment such as the type, temperature, and pressure of a sealed fluid and the sliding speed of a sliding face can be provided.

(2) When the positive pressure relief groove 35 is formed on the sliding face S, the positive pressure relief groove 35 can be easily formed.

(3) When the positive pressure relief groove 35 is formed in such a manner as to extend through the inside of the sliding face S, no groove is formed on the sliding face S. Therefore, the sliding face S can be kept clean. In addition, since the area of the sliding face is not reduced, an increase in surface pressure can be prevented.

(4) The circumferentially adjacent dimples 30 are arranged such that the positive pressure generation region 30b of the dimple 30 located at the upstream side is radially overlapped with the cavitation formation region 30a of the dimple 30 located at the downstream side. Therefore, the effect of leakage prevention is further exerted.

Fourth Embodiment

Figure 7:
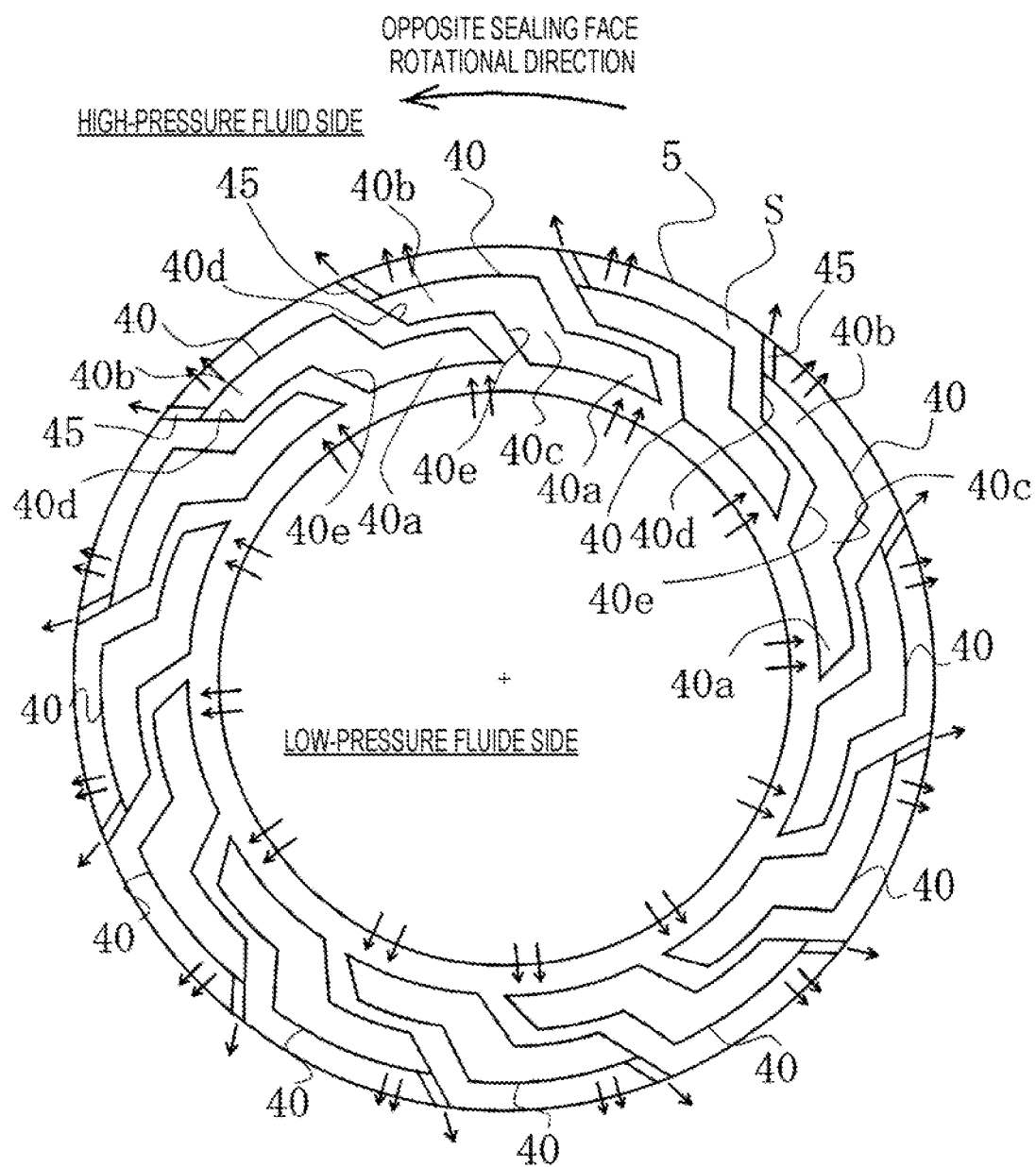
FIG. 7 is a plan view of a sliding face of a sliding part according to a fourth embodiment of the present invention.
Figure 8:
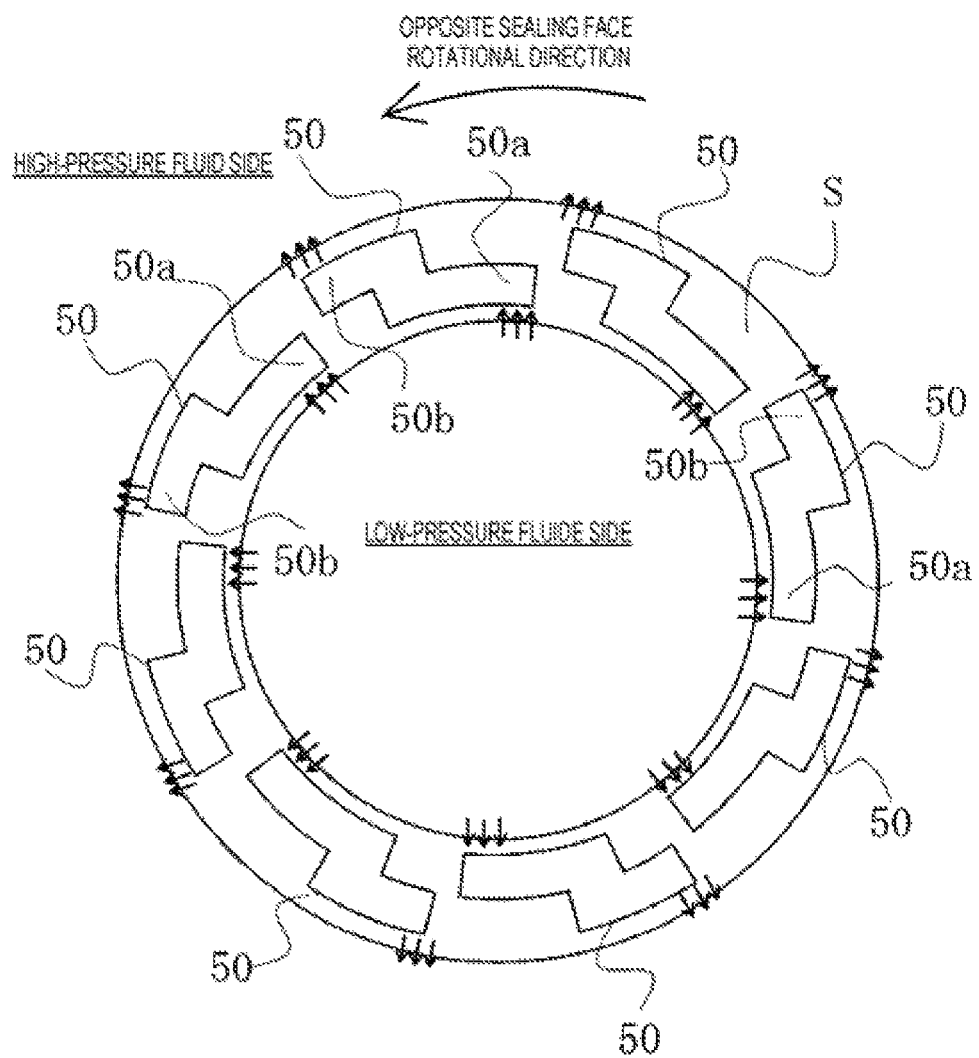
FIG. 8 is a plan view for illustrating a sliding part according to the prior art.

FIG. 7 shows a sliding face of a sliding part according to a fourth embodiment of the present invention. A case where dimples and positive pressure relief grooves are formed in the sliding face of the stationary ring 5 in FIG. 1 will be described as an example.

The same applies to a case where dimples and positive pressure relief grooves are formed in the sliding face of the rotating ring 3.

The fourth embodiment is different from the second embodiment shown in FIG. 5 in the arrangement of dimples, but otherwise the same as the second embodiment. Therefore, redundant descriptions will be omitted.

In FIG. 7, dimples 40 circumferentially adjacent to each other are arranged such that a positive pressure generation region 40b of the dimple 40 located at the upstream side is radially overlapped with a cavitation formation region 40a of the dimple 40 located at the downstream side.

When dynamic pressure (positive pressure) is generated in the positive pressure generation region 40b of the dimple 40 located at the upstream side, a fluid is mainly returned toward the high-pressure fluid side near the positive pressure generation region 40b, but part of the fluid is likely to leak toward the low-pressure fluid side. However, the cavitation formation region 40a of the dimple 40 at the downstream side is disposed on the low-pressure fluid side of the positive pressure generation region 40b. Therefore, the fluid likely to leak toward the low-pressure fluid side is drawn into the cavitation formation region 40a, thus being prevented from leaking toward the low-pressure fluid side.

A downstream end 40d of the positive pressure generation region 40b of the dimple 40, and a downstream end 40e of a connection region 40c that connects the cavitation formation region 40a and the positive pressure generation region 40b are formed in such a manner as to be inclined downstream from the low-pressure fluid side to the high-pressure fluid side.

Also, positive pressure relief grooves 45 are each provided at an angle parallel to the downstream end 40d of the positive pressure generation region 40b.

In the example in FIG. 7, the positive pressure relief groove 45 is formed on the sliding face S, but not limited thereto. The positive pressure relief groove 25 may be provided in such a manner as to extend through the inside of the sliding face S.

The downstream end 40d of the positive pressure generation region 40b of the dimple 40, and the downstream end 40e of the connection region 40c that connects the cavitation formation region 40a and the positive pressure generation region 40b are formed in such a manner as to be inclined downstream from the low-pressure fluid side to the high-pressure fluid side. Therefore, the flow of fluid in the dimple 40 becomes smooth, and a radial fluid flow from the low-pressure fluid side to the high-pressure fluid side is generated. Consequently, sealing performance can be enhanced.

Further, the positive pressure relief groove 45 is provided at an angle parallel to the downstream end 40d of the positive pressure generation region 40b. Therefore, positive pressure generated in the positive pressure generation region 40b can be smoothly released to the high-pressure fluid side. Consequently, sealing performance can be further enhanced.

According to the configurations of the fourth embodiment described above, the following effects are obtained.

(1) The positive pressure relief groove 45 that connects the positive pressure generation region 40b and the high-pressure fluid side is provided at the downstream distal end of the positive pressure generation region 40b, thereby being configured to control the ratio between the size of the cavitation formation region 40a and the size of the positive pressure generation region 40b. Therefore, the sliding component having both functions of leakage prevention and lubrication in accordance with the environment such as the type, temperature, and pressure of a sealed fluid and the sliding speed of a sliding face can be provided.

(2) When the positive pressure relief groove 45 is formed on the sliding face S, the positive pressure relief groove 45 can be easily formed.

(3) When the positive pressure relief groove 45 is formed in such a manner as to extend through the inside of the sliding face S, no groove is formed on the sliding face S. Therefore, the sliding face S can be kept clean. In addition, since the area of the sliding face is not reduced, an increase in surface pressure can be prevented.

(4) The downstream end 40d of the positive pressure generation region 40b of the dimple 40, and the downstream end 40e of the connection region 40c that connects the cavitation formation region 40a and the positive pressure generation region 40b are formed in such a manner as to be inclined downstream from the low-pressure fluid side to the high-pressure fluid side. Therefore, the flow of fluid in the dimple 40 becomes smooth, and a radial fluid flow from the low-pressure fluid side to the high-pressure fluid side is generated. Consequently, sealing performance can be further enhanced.

(5) The positive pressure relief groove 45 is provided at an angle parallel to the downstream end 40d of the positive pressure generation region 40b. Therefore, positive pressure generated in the positive pressure generation region 40b can be smoothly released to the high-pressure fluid side. Consequently, sealing performance can be further enhanced.

(6) The circumferentially adjacent dimples 40 are arranged such that the positive pressure generation region 40b of the dimple 40 located at the upstream side is radially overlapped with the cavitation formation region 40a of the dimple 40 located at the downstream side. Therefore, the effect of leakage prevention is further exerted.

Although the embodiments of the present invention have been described above with reference to the drawings, specific configurations are not limited to these embodiments. Any changes and additions made without departing from the scope of the present invention are included in the present invention.

For example, although the embodiments have described the example where the sliding part is used as one of the pair of rotating and stationary rings in the mechanical seal device, the sliding part can be used as a bearing sliding part that slides along with a rotating shaft while sealing lubricating oil on one axial side of a cylindrical sliding face.

Also, for example, although the embodiments have described the case where the high-pressure sealed fluid is present on the outer peripheral side, the present invention can be applied to a case where a high-pressure fluid is on the inner peripheral side. In that case, dimples may be disposed such that cavitation formation regions are located on the outer peripheral side and positive pressure generation regions are located on the inner peripheral side. When grooves each having directionality are provided, it is only required that the grooves are disposed in the opposite direction to the embodiments.

Further, for example, although the embodiments describe the case where the dimples are each formed to extend circumferentially in a crank shape, the dimple is not limited to such a shape. In short, the dimple may be preferably configured such that the upstream cavitation formation region is disposed close to the low-pressure fluid side and that the downstream positive pressure generation region is formed to be disposed close to the high-pressure fluid side. For example, the dimple may be a rectangle, an oval, or the like which is disposed in an inclined manner.

Furthermore, although the embodiments have described the case where the positive pressure relief groove is rectangular in cross section, but not limited thereto. The positive pressure relief groove may be circular, semicircular, or triangular, or the like in cross section.

REFERENCE SIGN LIST 1 rotating shaft
2 sleeve
3 rotating ring
4 housing
5 stationary ring
6 coiled wave spring
7 bellows
10, 20, 30, 40 dimple
10a, 20a, 30a, 40a cavitation formation region
10b, 20b, 30b, 40b positive pressure generation region
10c, 20c, 30c, 40c connection region
11 narrowed gap (step)
12 widened gap (step)
15, 25, 35, 45 positive pressure relief groove
20d, 40d downstream end of positive pressure generation region
20e, 40e downstream end of connection region
S sliding face

The invention claimed is:

1. A sliding component comprising:
a pair of sliding parts having sliding faces to slide relative to each other between a low-pressure fluid side and a high-pressure fluid side, one of the sliding faces being provided with dimples, each dimple having a crank shape, as viewed toward the one of the sliding faces, constituted by:
an upstream cavitation formation region disposed, at an upstream side of the crank shape with respect to a rotational direction of another of the sliding faces, closer to the low-pressure fluid side than to the high-pressure fluid side, and extending along a circumferential direction of the one of the sliding faces,
a downstream positive pressure generation region disposed, at a downstream side of the crank shape with respect to the rotational direction of the another of the sliding faces, closer to the high-pressure fluid side than to the low-pressure fluid side, and extending along the circumferential direction, and
a connection region connecting the upstream cavitation formation region on the downstream side and the downstream positive pressure generation region on the upstream side in a manner that the upstream cavitation formation region and the downstream positive pressure generation region communicate with each other via the connection region,
wherein a positive pressure relief groove is provided at a distal end, on the downstream side, of the downstream positive pressure generation region in a manner connecting the downstream positive pressure generation region and the high-pressure fluid side whereby the downstream positive pressure generation region communicates with the high-pressure fluid side via the positive pressure relief groove, wherein the positive pressure relief groove has a depth being shallower than a depth of the dimple and is configured to control a ratio between a size of the upstream cavitation formation region and a size of the downstream positive pressure generation region.

2. The sliding component according to claim 1, wherein the positive pressure relief groove is formed on the sliding face.

3. The sliding component according to claim 1, wherein the positive pressure relief groove is formed as a through-hole extending through a land between the positive pressure generation region of the dimple and the high-pressure fluid side, without forming a groove on the one of the sliding faces.

4. The sliding component according to claim 1, wherein the dimples circumferentially adjacent to each other are arranged such that the positive pressure generation region of the dimple located at the upstream side is radially overlapped with the cavitation formation region of the dimple located at the downstream side.

5. The sliding component according to claim 1, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

6. The sliding component according to claim 5, wherein the positive pressure relief groove is provided at an angle parallel to the downstream end of the positive pressure generation region.

7. The sliding component according to claim 2, wherein the dimples circumferentially adjacent to each other are arranged such that the positive pressure generation region of the dimple located at the upstream side is radially overlapped with the cavitation formation region of the dimple located at the downstream side.

8. The sliding component according to claim 2, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

9. The sliding component according to claim 3, wherein the dimples circumferentially adjacent to each other are arranged such that the positive pressure generation region of the dimple located at the upstream side is radially overlapped with the cavitation formation region of the dimple located at the downstream side.

10. The sliding component according to claim 3, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

11. The sliding component according to claim 4, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

12. The sliding component according to claim 7, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

13. The sliding component according to claim 9, wherein the dimple includes a shape which has a radially fixed width and which circumferentially extends, and a downstream end of the positive pressure generation region and a downstream end of a connection region connecting the cavitation formation region and the positive pressure generation region are formed to be inclined downstream from the low-pressure fluid side to the high-pressure fluid side.

14. The sliding component according to claim 8, wherein the positive pressure relief groove is provided at an angle parallel to the downstream end of the positive pressure generation region.

15. The sliding component according to claim 10, wherein the positive pressure relief groove is provided at an angle parallel to the downstream end of the positive pressure generation region.

16. The sliding component according to claim 11, wherein the positive pressure relief groove is provided at an angle parallel to the downstream end of the positive pressure generation region.

17. The sliding component according to claim 12, wherein the positive pressure relief groove is provided at an angle parallel to the downstream end of the positive pressure generation region.

18. The sliding component according to claim 13, wherein the positive pressure relief groove is provided at an angle parallel to the downstream end of the positive pressure generation region.

* * * * *